J. H. Jones,
Water Wheel.

No. 92,456. Patented July 13, 1869.

Witnesses
F. C. Thayer
J. J. Arnold

Inventor
Julius H. Jones

JULIUS H. JONES, OF CHARLTON, MASSACHUSETTS.

*Letters Patent No. 92,456, dated July 13, 1869.*

IMPROVEMENT IN SCROLL-GATES FOR WATER-WHEELS.

The Schedule referred to in these Letters Patent and making part of the same.

*To all whom it may concern:*

Be it known that I, JULIUS H. JONES, of Charlton, in the county of Worcester, State of Massachusetts, have invented a new and useful Adjustable Scroll-Gate for Water-Wheels; and I do hereby declare the following to be a full, clear, and exact description of the construction of the same, due reference being had to the accompanying drawings.

In which drawings—

Figure 1:
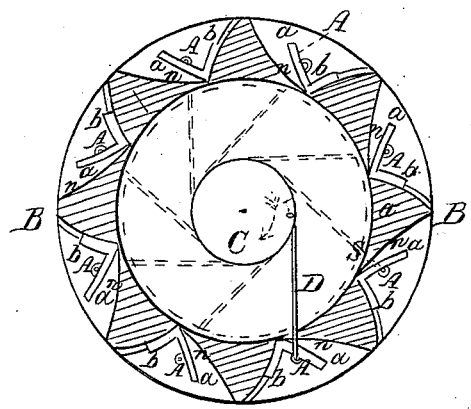

Figure 1 is a view of my invention from above.

Figure 2:
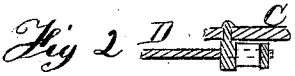

Figure 2, showing a connecting-rod and its spring on a larger scale.

My invention applies more particularly to that class of horizontal wheels known as turbines, to which the water is admitted on all sides, and it is designed to form sluices or water-ways for that purpose, of such form as to give a full, smooth stream to the buckets at all their various degrees of opening, the stream corresponding to the depth of wheel or length of bucket all the time.

Fig. 1 shows a top view and plan of my invention.

A A A are the gates, with a lip, $b\ b\ b\ b$, covering the opening behind them, and the ends $a\ a\ a$ made flaring back from the faces $n\ n\ n\ n$, against which they close, with a jet, if preferred, at the inner end of the face $n$, the gate being shown in dotted lines $o$ inside the case, and hung on a pivot at $s$.

These gates are made in the rim B, surrounding the wheel and of the same depth. At C is a rim or collar, with connections to each gate, one of which is shown at D. These pivot to each gate, and the other end has a spring-connection to the rim, so that if one gate has any obstruction, the spring yields and allows the others to be closed.

One mode of doing this is shown in fig. 2, the rim being moved by any suitable mechanism; the flaring end, always forming a taper-way for the water at all degrees of opening, admits the water in the best form.

In some cases it may be better to make the lips $b\ b\ b$ move on a circle corresponding to the edge of the rim B, and then connect them to the gates A A by a link or other suitable mechanism, and, if desired, the operating-mechanism may be applied through them, and then the whole gates will or may be covered when closed.

I do not claim " winged-gates in combination with scroll-shutes," as patented in patent No. 22,901, issued in 1859, as such are not new; but

What I claim as new, and desire to secure by Letters Patent, is—

1. The gate A, with its flaring end-shield or guard, and covered inner end, and ways $a\ a$, substantially as described.

2. The described gates, spring-connections, and operating-mechanism, substantially as set forth.

JULIUS H. JONES.

Witnesses:
F. C. THAYER,
J. G. ARNOLD.